INVENTOR.
Richard O. Holzworth,
BY
McMorrow, Berman & Davidson
ATTORNEYS.

June 6, 1950 R. O. HOLZWORTH 2,510,176
DIRECTION SIGNAL SWITCH
Filed June 28, 1946 2 Sheets-Sheet 2

INVENTOR.
Richard O. Holzworth,
BY
McMorrow, Berman & Davidson
ATTORNEYS.

Patented June 6, 1950

2,510,176

UNITED STATES PATENT OFFICE 2,510,176

DIRECTION SIGNAL SWITCH

Richard O. Holzworth, Vinton, Iowa

Application June 28, 1946, Serial No. 680,269

1 Claim. (Cl. 200—59)

The present invention relates to improvements in signalling apparatus and more particularly to direction and caution indicating signals.

One of the main objects thereof is to provide a simple, efficient and inexpensive direction and caution signalling devices for particular use upon a vehicle.

Another object thereof is to provide an electrically operated indicating signal device so shaped, constructed and arranged on an automobile or other vehicle that a minimum amount of attention and operation is exacted from the car operator in effecting selectively the desired signalling indications.

Another object thereof is to provide a novel type of signalling apparatus for automobiles and the like pursuant to which the car operator needs only to slide his hand already engaged with the steering wheel of the machine and shift the position of a neutrally placed hand lever where it predeterminatedly activates a circuit maker for the purpose of closing the electrical circuit to the required signalling lamp.

A still further object thereof is to provide means for automatically presetting the circuit closing and opening hand operated lever for the signalling apparatus in such a manner that after it has been moved to convey the intended indication the steering wheel may, when it is itself moved back to normal position, effect the return movement of the hand lever to initially neutral circuit opening position.

With the above and other objects in view my invention consists in the combination, arrangement and details of construction disclosed in the drawings and specification, and then more particularly pointed out in the appended claim.

In the drawings, wherein similar reference characters designate similar parts throughout the respective views, Figure 1 is a plan view of the circuit maker and breaker according to the invention, parts being broken away and shown in horizontal section;

Figure 1:
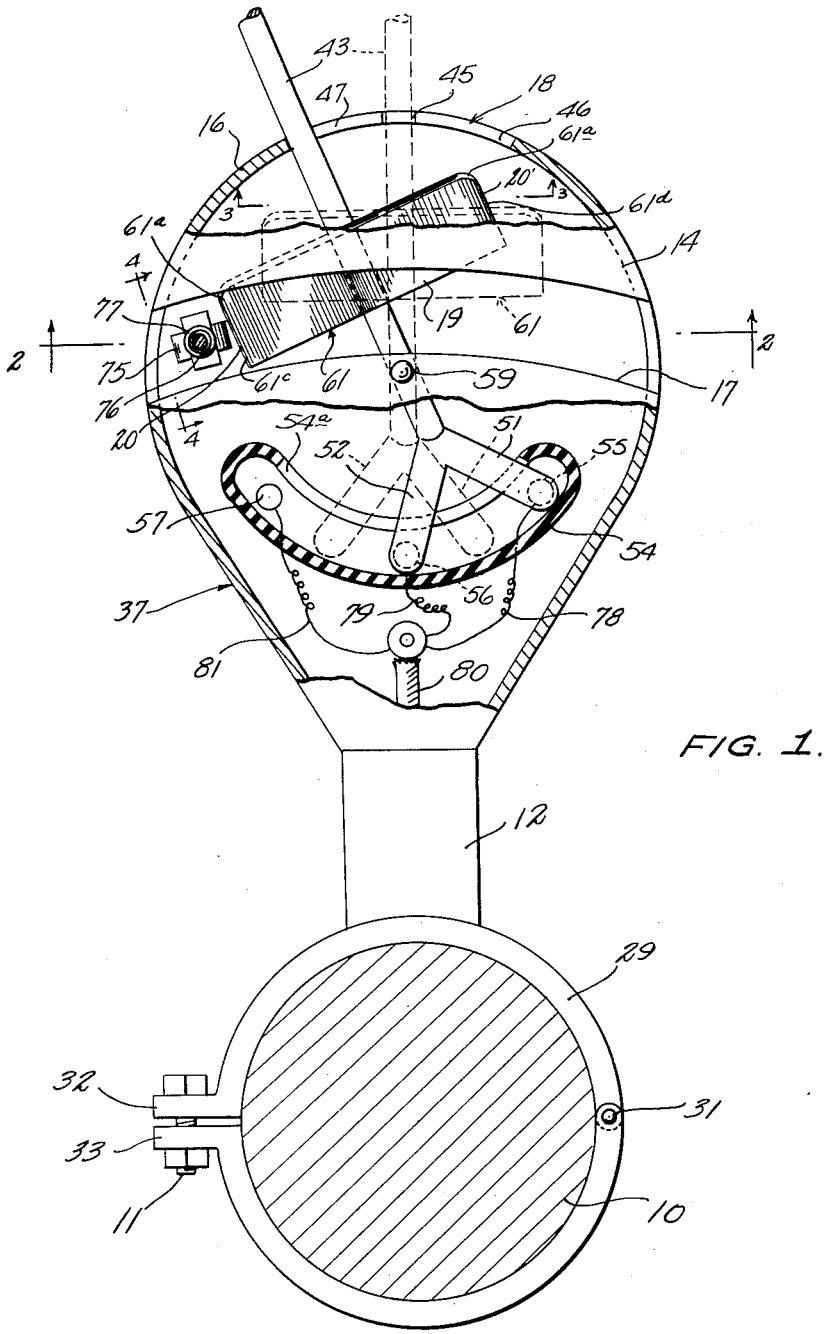

Referring specifically to the drawing, wherein like reference characters have been used throughout the several views to designate like parts, and referring at first to Figure 1, 10 designates the steering column of an automobile which is adapted to have clamped thereto a split ring 29 comprising a clamp. The segments of the ring 29 are pivotally connected by any suitable pintle 31 at one side of the steering column. The opposite ends of the segments are extended to provide ears 32 and 33 adapted to receive any suitable clamping means such as the bolt 11. One of the segments of the clamp 29 includes a laterally-directed arm 12 the outer end of which has fixedly secured thereto a switch housing 37. The housing 37 includes a floor 13, a top 14, side walls 15 and a substantially semi-circular rear wall 16. The top wall 14 is formed with an arcuate slot 17 therein which is concentric to the axis of the steering column 10. Upper portions of the side walls 15 are cut away, as at 17', to provide continuations of the slots 17. The rear wall 16 intermediate the top and bottom walls 14 and 13 is formed with a slot 18 therein which extends in parallel relation to the top 14 and floor 13. The slot 8 includes a central notch 45 and oppositely-directed lateral portions 46 and 47. A switch arm 43 extends radially of the rear wall 16 and is slidable in the slot 18. Likewise, the notch 45 of the slot provides a recess seating the arm 43 in a neutral position. The switch arm 43 is pivoted between the top 14 and floor 13 by means of a vertical pivot pin 59 fixed to the top 14 and the floor 13 in any wellknown manner.

Inwardly of the pivot 59 the switch arm 43 is provided with a pair of switch-providing contact fingers 51 and 52 comprising a fork. Such fingers 51 and 52 extend through a slot 54a formed in the adjacent wall of a contact mounting housing 54 formed of insulating material. The housing 54 has mounted therein an arcuate series of contacts which are equally spaced from each other and comprise a contact 55, a contact 56, and a contact 57. The contact 56 is connected by any suitable lead 79 and cable 80 to any suitable source of electric current, not shown. Likewise, the contacts 55 and 57 are connected respectively by any suitable leads 78 and 81 and the cable 80 to left and right hand turn-designating signals, not shown. As is indicated in broken lines, Figure 1, when the switch arm 43 is seated in the notch 45 of the slot 18, the contact fingers 51 and 52 thereof are extended between the contacts 55 and 56 and the contact 56 and 57 respectively.

However, when the operator of the vehicle desires to designate a left turn, the switch arm 43 is lifted out of the notch 45 by flexing upwardly that portion thereof rearwardly of said pivot 59. Thereafter, the arm 43 is moved in a counter-clockwise direction to the full line position, Figure 1. In this position the contact finger 51 engages the contact 55 while the contact finger 52 engages the contact 56 whereby to bridge such contacts and close a circuit to a signal lamp designating a left turn.

Figure 2:
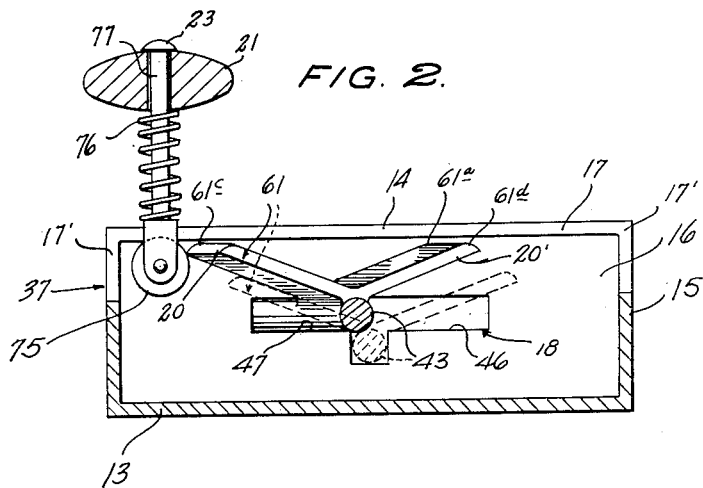
Figure 2 is a transverse vertical sectional view taken substantially on the plane of the line 2—2 of Figure 1.
Figure 4:
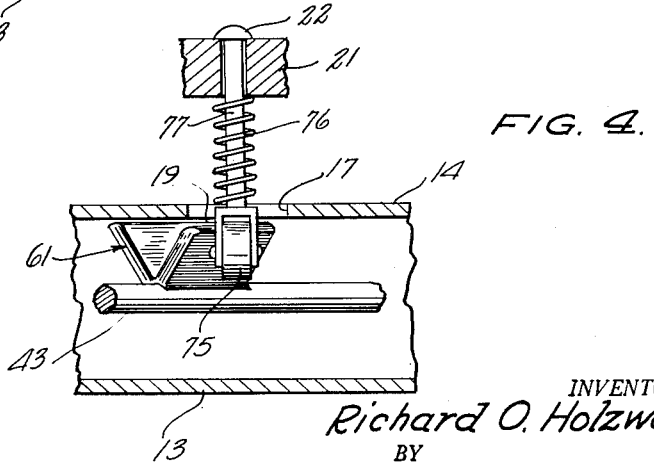
Figure 4 is a fragmentary vertical sectional view illustrating the operation of the device and taken substantially on the plane of the line 4—4 of Figure 1.

A ratchet-shaped ramp 61 is fixed to the arm 43 transversely thereof and is so located on such arm that when the arm 43 is seated in the notch 45 the ramp 61 is substantially clear of the slot 17 in the top 14 of the housing. However, when the switch arm 43 is moved to either limit of the slot 18 to designate a left or right turn, the ramp 61 is disposed substantially transversely of the slot 17 and in subjacent relation thereto as is clearly indicated in full lines, Figures 1, 2 and 4. As indicated in Figure 4, the ramp 61 includes an upwardly-inclined front surface 19 and an overhanging rear surface whereby the ramp 61 is substantially ratchet-shaped for a purpose to be described later. Likewise, the ends of the slots 18 are so located relative to the ends of the slots 17 that the end edges 20 or 20' of the ramp 61 extends across an end of the slot 17 when the ramp is in a turn-designating position.

Referring now to Figure 4, in connection with Figure 1, it is noted that a spoke 21 of the steering wheel has slidably fixed in relation thereto a pin 77. The lower end of the pin 77 rotatably mounts a roller 75. A coil spring 76 is concentrically-disposed about the pin 77 and biases the same end and said roller 75 for downward movement relative to the spoke 21. A head 22 on the upper end of the pin 77 limits such downward movement. The pin 77 is so disposed on the spoke 21 that the normal path of the roller 75 coincides with the slot 17 and such roller is received in such slot as the steering wheel is rotated in the process of making a turn or straightening out the steering gear after the completion of the turn. Entry to slot 17 is permitted by slot extension 17'. As is readily apparent from Figure 1, with the switch arm 43 in the neutral position the ramp 61 is substantially free of the slot 17 and is not in the path of the roller 75 whereby no switching operation takes place as the steering wheel is rotated. However, when the switch arm 43 together with the ramp 61 is moved to a turn-designating position such as that shown in full lines in Figure 1 or in Figure 2, the ramp 61 presents its upwardly-inclined face 19 to the roller 75 as the steering wheel is turned in the direction to make the designated turn. Thus the roller 75 rides easily over the ramp 61 as long as the steering wheel is rotated in a turn-generating direction. However, as soon as the turn is completed and a return rotation is applied to the steering wheel to straighten out the steering gear, the end edge 20 or 20' of the ramp 61 is presented to the roller 75 and engages the same. Thus, the ramp 61 and switch arm 43 is carried with the roller 75 until the switch arm reaches the neutral position at which point it drops down into the notch 45 whereby the ramp is lowered slightly and the beveled end surfaces 61c or 61d thereof permit the roller 75 to ride clear of the ramp. Thus, the switch is automatically moved to a neutral or open position as soon as return rotation of the wheel is commenced.

Further return rotation of the wheel will find the ramp 61 in the clear position and no signal will be given.

Figure 3:
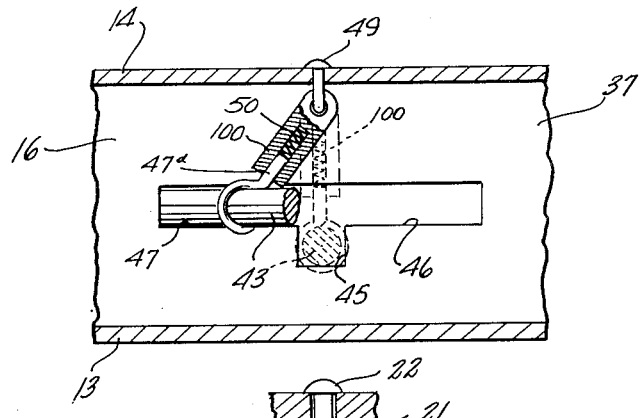
Figure 3 is a fragmentary vertical sectional view on a slightly enlarged scale and taken substantially on the plane of the line 3—3 of Figure 1.

Referring now to Figure 3, means are provided for facilitating the action of the switch arm 43 in all directions. This is accomplished by a means now to be described for spring-loading the same both to the turn-designating positions and to the neutral position. Such means comprises a pin 49 swiveled in the top 14 of the casing 37 which has pivoted thereto a tubular guide 100. The tubular guide 100 slidably receives a stem 47a which in turn is pivoted to the switch arm 43 in any suitable manner. Interposed between the upper end of the stem 47a and the closed upper end of guide 100 is a coil spring 50 which loads the stem 47a and the switch arm 43 for movement away from the guide 100. Thus, when the switch arm 43 is raised out of the notch 45 such movement is against the action of spring 50.

Moreover, as soon as motion in a lateral direction is applied to the switch arm 43 in either of the slot portions 46 or 47, the expansive action of the spring 50 causes the switch arm 43 to be snapped to the limit of the slot in that direction. Thus, the operator of the arm has only to raise the switch arm out of the slot or notch 45 and start it in the direction of one of the slot portions 46 or 47 and the spring 50 will do the rest. Likewise, when the ramp 60 is engaged by the roller 75 as is indicated in Figure 4, the switch arm is moved against the action of the spring 50 until the switch arm is above the notch 45 at which time the spring 50 will snap the switch arm downwardly into the notch 45. Thus, there is no danger of the roller 75 carrying the parts to the opposite end of the slot 18.

Thus, while I have shown and described what is now thought to be a preferred embodiment of the invention, the same is susceptible of other forms and expressions. Consequently, I do not limit myself to the precise structure shown and described hereinabove except as hereinafter claimed.

I claim:

In a switch for an automobile directional signal including a stationary switch housing fixed to the steering column in subjacent relation to the steering wheel, and wherein depending means on the steering wheel is effective to de-activate a manually-actuated switch in said housing upon return rotation of said wheel after a turn, the improvement comprising said housing including an upper surface formed with an arcuate slot therein concentric to said steering column, said slot being in the path of said depending means and receiving the same therein as said steering wheel is rotated in both directions, said switch including a switch arm pivoted in said housing and including a portion underlying said slot and extending radially thereof, a substantially ratchet-shaped ramp fixed atop said arm portion and extending transversely thereof, said ramp including an upwardly-inclined front surface and substantially vertically disposed end surfaces, said arm being manually pivoted in opposite directions from a central neutral position to oppositely-disposed turn-designating positions wherein said end surfaces of said ramp are selectively disposed substantially transversely across said slot adjacent opposite ends thereof so as to present said inclined surface to said depending means during turn-providing rotation of said wheel and to present a vertical end surface thereof to said depending means during return rotation of said wheel, whereby to be engaged by said depending means and returned to said neutral position upon return rotation of said steering wheel.

RICHARD O. HOLZWORTH.

REFERENCES CITED

The following references are of record in the file of this patent:

UNITED STATES PATENTS

| Number | Name | Date |
|---|---|---|
| 1,465,596 | Collins et al. | Aug. 21, 1923 |
| 1,615,949 | Lincicome | Feb. 1, 1927 |
| 1,636,024 | Vose | July 19, 1927 |
| 1,690,370 | Hoeller | Nov. 6, 1928 |
| 1,713,305 | Stonehill | May 14, 1929 |
| 1,884,117 | Mortssen | Oct. 25, 1932 |
| 1,996,417 | Haines | Apr. 2, 1935 |
| 2,120,288 | McCready | June 14, 1938 |